Dec. 15, 1942.   J. W. PERCY   2,305,442
BESSEMER CONVERTER BATH MEASURING
Filed March 29, 1941
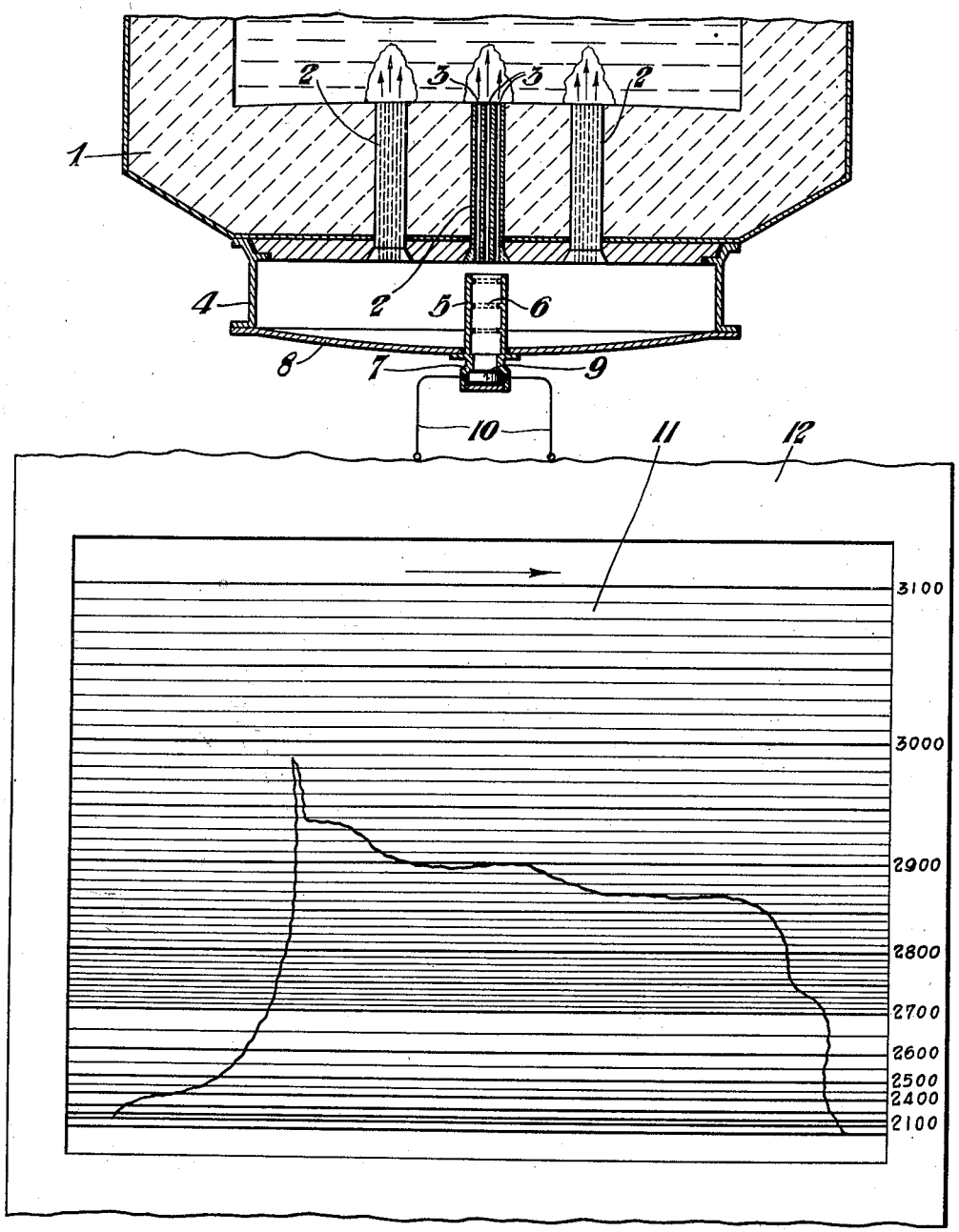
Inventor:
JAMES WARD PERCY,
by: John E. Jackson
his Attorney.

Patented Dec. 15, 1942

2,305,442

UNITED STATES PATENT OFFICE 2,305,442

BESSEMER CONVERTER BATH MEASURING

James Ward Percy, Jersey City, N. J., assignor to United States Steel Corporation of Delaware, a corporation of Delaware Application March 29, 1941, Serial No. 385,947

3 Claims. (Cl. 266—35)

This invention is mainly concerned with measuring the temperature of the bath in an operating Bessemer converter, but its principles may be applicable for other purposes.

A specific example of the invention is illustrated by the accompanying drawing schematically illustrating in vertical section a conventional Bessemer converter bottom embodying the example.

More specifically, this drawing shows the bottom shell 1, the tuyères 2 with their air holes 3 and the wind chest 4 which carries the air blast to the holes 3 of the various tuyères. The blast rises through these holes so as to be forced through the metal bath above the bottom and burn out the various impurities. This bath is, of course, contained by the usual body to which the illustrated bottom is fixed.

As is well known, flame, smoke and fume leave the converter nose so that it is impossible to directly see the bath. As a result, the bath temperatures have heretofore been calculated by indirect determination methods.

According to the present invention, a tube 5 containing a series of optical diaphragms 6 and having its outer end provided with an airtight housing 7, is mounted in an airtight manner through the cover plate 8 of the wind chest 4. The housing 7 houses a radiant energy responsive device 9 which is illustrated as a photronic cell, the arrangement being such that the tube 5 sights the device 9 axially up through one of the holes 3 of one of the tuyères 2 directly at the molten metal held above this tuyère by the blast, the device receiving direct energy radiation from the bath and the diaphragms 6 being arranged to shield the device 9 from reflected radiations.

When the device 9 is a photronic cell, the temperature of the bath may be determined by connecting the device through lines 10 with an electrical recorder 11 which is illustrated as being a milliammeter recording device containing the necessary amplifiers and provided with a traveling graph strip 12 on which is continuously recorded the electrical response of the device 9 to the radiations it receives from the converter bath by way of the tuyère hole. Calibration may be effected so that the response recorded is directly translated into terms of temperature on the strip 12, the drawing illustrating this strip in enlarged scale to show what a temperature record of one Bessemer blow looks like.

The device 9 may be any that permits the energy radiating from the bath through the tuyère hole, to be measured. Filters may be used to make the device 9 responsive to restricted radiation frequency ranges as is often done in optical pyrometry. Likewise, it may be necessary to use a lens system for focusing the radiation on the sensitive element of the device 9, and water or air cooling of the radiant energy measuring device may prove necessary.

It is to be understood that the blast in the wind chest provides an air pressure at the tuyère nose that exceeds the ferrostatic pressure of the bath.

It is apparent that the invention disclosed permits all the principles of optical pyrometry and radiant energy measuring in general, to be applied directly to a Bessemer converter bath, the invention providing for an unobscured view of the bath. This view may be obtained through one or any number of the tuyère holes and the radiant energy measuring device may be any capable of quantitatively or qualitatively measuring the energy radiated from the bath.

I claim:

1. A Bessemer converter having an optical sighting passageway built directly in its wall beneath the normal operating level of the metal it contains at such an angle that this metal tends to flow into the passageway, means for maintaining a gas pressure in said passageway to keep the metal from flowing thereinto and radiant energy measuring means sighted at the metal through said passageway.

2. A Bessemer converter having a device sealed substantially airtight in its wind chest in line with one of its tuyère holes, which measures energy radiated through this hole from the bath when the converter is in operation, said device being electrically responsive to light and in circuit with a device for measuring its electrical response.

3. A method of measuring energy radiated by the bath in a Bessemer converter when the latter is in operation, said method including optically sighting a radiant energy measuring device on said bath through at least one of the tuyère holes of the converter and operating said device to measure energy radiated from said bath through said hole.

JAMES WARD PERCY.